United States Patent
Kim et al.

(10) Patent No.: US 11,422,852 B2
(45) Date of Patent: Aug. 23, 2022

(54) ELECTRONIC DEVICE CAPABLE OF INCREASING TASK MANAGEMENT EFFICIENCY OF DIGITAL SIGNAL PROCESSOR

(71) Applicant: Samsung Electronics Co., Ltd., Suwon-si (KR)

(72) Inventors: Won Jin Kim, Suwon-si (KR); Keong Ho Lee, Seoul (KR); Hyuk Min Kwon, Yongin-si (KR); Rakie Kim, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 73 days.

(21) Appl. No.: 16/205,727

(22) Filed: Nov. 30, 2018

(65) Prior Publication Data

US 2019/0179670 A1    Jun. 13, 2019

(30) Foreign Application Priority Data

Dec. 11, 2017    (KR) ........................ 10-2017-0169551

(51) Int. Cl.
*G06F 9/46*      (2006.01)
*G06F 9/48*      (2006.01)
*G06F 9/50*      (2006.01)

(52) U.S. Cl.
CPC .......... *G06F 9/4881* (2013.01); *G06F 9/4812* (2013.01); *G06F 9/5038* (2013.01)

(58) Field of Classification Search
CPC ..................................................... G06F 9/4881
USPC .......................................................... 718/103
See application file for complete search history.

(56) References Cited

U.S. PATENT DOCUMENTS

| | | | |
|---|---|---|---|
| 7,035,852 B2 * | 4/2006 | Hopewell | G06F 9/546 |
| 7,730,488 B2 * | 6/2010 | Ilzuka | G06F 9/5055 |
| | | | 718/102 |
| 8,656,145 B2 | 2/2014 | Plondke et al. | |
| 8,868,755 B2 * | 10/2014 | Attaluri | G06F 9/5005 |
| | | | 709/226 |

(Continued)

FOREIGN PATENT DOCUMENTS

| | | |
|---|---|---|
| EP | 2282265 A1 | 2/2011 |
| JP | 5735187 B2 | 6/2015 |

(Continued)

*Primary Examiner* — Evral E Bodden
(74) *Attorney, Agent, or Firm* — Harness, Dickey & Pierce, P.L.C.

(57) ABSTRACT

A processor includes a plurality of cores configured to perform operations independently, a memory, and a control circuit electrically connected to the plurality of cores and the memory. The control circuit is configured to acquire one or more instructions associated with a task, store data corresponding to the task based on the one or more instructions, transmit the instructions to the at least some cores, check one or more cores that have responded to the instructions among the at least some cores, prevent the task from being allocated to the cores except for one core if the task is allocated to the one core, and allocate the task to one of the cores, the allocation of the task including changing state information associated with the allocation and setting other cores not allocated the task among the plurality of cores not to access the data corresponding to the task.

20 Claims, 9 Drawing Sheets

(56) References Cited

U.S. PATENT DOCUMENTS

| | | | |
|---|---|---|---|
| 9,152,467 B2 * | 10/2015 | Cadambi | G06F 9/5033 |
| 9,280,393 B2 * | 3/2016 | Bird | G06F 9/5016 |
| 9,645,866 B2 | 5/2017 | Bourd et al. | |
| 9,692,820 B2 * | 6/2017 | Chaudhary | H04L 67/1002 |
| 9,880,875 B2 * | 1/2018 | Park | G06F 9/4881 |
| 10,564,962 B2 * | 2/2020 | Tashiro | G06F 9/3004 |
| 10,846,136 B2 * | 11/2020 | Muthiah | H04L 47/19 |
| 2006/0095911 A1 * | 5/2006 | Uemura | G06F 1/206 |
| | | | 718/100 |
| 2007/0074207 A1 * | 3/2007 | Bates | G06F 9/5027 |
| | | | 718/1 |
| 2009/0144742 A1 * | 6/2009 | Subhraveti | G06F 11/203 |
| | | | 718/104 |
| 2009/0172683 A1 * | 7/2009 | Lin | G06F 9/505 |
| | | | 718/103 |
| 2012/0069029 A1 | 3/2012 | Bourd et al. | |
| 2013/0155080 A1 | 6/2013 | Nordlund et al. | |
| 2013/0205126 A1 | 8/2013 | Kruglick | |
| 2015/0286225 A1 | 10/2015 | Park et al. | |
| 2021/0026637 A1 * | 1/2021 | Vorbach | G06F 9/30043 |

FOREIGN PATENT DOCUMENTS

| | | |
|---|---|---|
| KR | 100791296 B1 | 1/2008 |
| KR | 101564816 B1 | 10/2015 |
| KR | 101651871 B1 | 9/2016 |
| KR | 101655137 B1 | 9/2016 |
| KR | 20160142834 A | 12/2016 |
| KR | 101694310 B1 | 1/2017 |
| KR | 101738641 B1 | 5/2017 |

\* cited by examiner

ELECTRONIC DEVICE CAPABLE OF INCREASING TASK MANAGEMENT EFFICIENCY OF DIGITAL SIGNAL PROCESSOR

This application claims priority from Korean Patent Application No. 10-2017-0169551 filed on Dec. 11, 2017 in the Korean Intellectual Property Office, the disclosure of which is incorporated herein by reference in its entirety.

BACKGROUND

1. Field of the Disclosure

The present disclosure relates to a task delivery method capable of quickly processing tasks in a plurality of digital signal processors (hereinafter also referred to as DSPs) and/or an electronic device including a plurality of DSPs in which the task delivery method is implemented.

2. Description of the Related Art

Along with the development of electronic technology, electronic devices having various functions such as smartphones, tablet personal computers (PCs), and the like are being widely used.

Recent electronic devices tend to have a main processor including a plurality of DSPs. A plurality of DSPs may serve as a main processor to perform signal processing functions such as a function of extracting information from signals originating from other internal devices, a function of changing details or characteristics of information, a voice coding function for digitalizing voice signals, a digital filter function, or a function of processing sounds or videos.

According to conventional DSP technology, a master DSP core may determine an execution command according to the order in which a command packet or a data message packet arrives at a queue and may monitor operation states of slave DSPs and perform scheduling to determine a slave DSP to receive the execution command based on a result of the monitoring.

However, according to a task delivery method between the above-described conventional DSPs, the master DSP core collects all task information and then performs scheduling and task delivery. Accordingly, when the number of tasks increases, the burden of the master DSP core increases. As a result, the task processing speed of the DSP may decrease.

SUMMARY

Various example embodiments of the present invention may provide a task delivery method capable of quickly processing tasks in a plurality of DSPs and also provide an electronic device including a plurality of DSPs in which the aforementioned method is implemented.

According to an aspect of the present inventive concept, there is provided a processor comprising a plurality of cores configured to perform operations independently, a memory, and a control circuit electrically connected to the plurality of cores and the memory. The control circuit is configured to acquire one or more instructions associated with a task to be processed using at least some of the plurality of cores, store data corresponding to the task in the memory based on the one or more instructions, deliver at least some of the one or more instructions to the at least some of the plurality of cores, check one or more of the plurality of cores that have responded to the at least some of the one or more instructions among the at least some cores, prevent the task from being allocated to the some of the plurality of cores except for one core among the some of the plurality of cores if the task is allocated to the one core, and allocate the task to the one core if the task is not allocated to the cores, the allocation of the task including changing state information associated with the allocation and setting other cores not allocated the task among the plurality of cores not to access the data corresponding to the task.

According to another aspect of the present inventive concept, there is provided a task processing method of a processor including a plurality of cores capable of performing operations independently, a memory, and a control circuit electrically connected to the plurality of cores and the memory, the task processing method comprising acquiring one or more instructions associated with a task to be processed using at least some of the plurality of cores, storing data corresponding to the task in the memory based on the one or more instructions, transmitting at least one of the one or more instructions to the at least some of the plurality of cores, checking one or more cores that have responded to the at least some of the one or more instructions among the at least some cores, preventing the task from being allocated to the plurality of cores except for one core if the task is allocated to the one core, and allocating the task to the one core, the allocation of the task including changing state information associated with the allocation and setting other cores not allocated the task among the plurality of cores not to access the data corresponding to the task.

According to still another aspect of the present inventive concept, there is provided an architecture comprising a plurality of cores including a plurality of different digital signal processors or at least one hardware accelerator, and a control circuit electrically connected to the plurality of cores, wherein the control circuit is configured to receive a task processing request from at least some of the plurality of cores, store instructions and information associated with the task in an internal memory, transmit at least some of the instructions associated with the task to the plurality of cores in an event form, and allocate the task to one core among the plurality of cores that has first responded to the at least some instructions among the plurality of cores.

It should be noted that objects of the present invention are not limited to the above-described objects, and other objects of the present invention will be apparent to those skilled in the art from the following descriptions.

BRIEF DESCRIPTION OF THE DRAWINGS

The above and other aspects and features of the present disclosure will become more apparent by describing in detail example embodiments thereof with reference to the attached drawings, in which.

DETAILED DESCRIPTION OF THE EXAMPLE EMBODIMENTS

Figure 1:
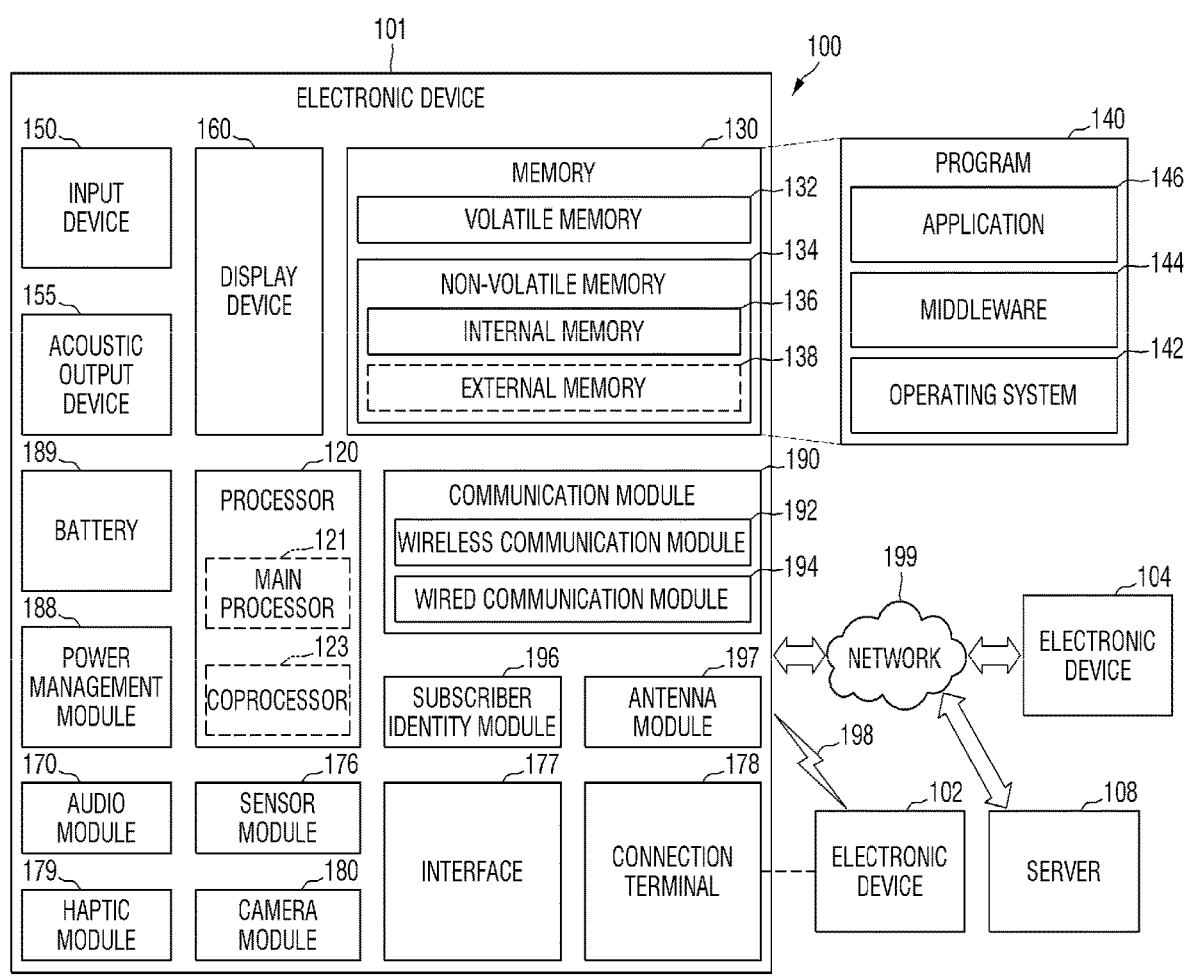
FIG. 1 is a block diagram of an electronic device in a network environment according to various example embodiments.

FIG. 1 is a block diagram of an electronic device 101 in a network environment 100 according to various example embodiments. Referring to FIG. 1, in the network environment 100, the electronic device 101 may communicate with an electronic device 102 over a first network 198 (e.g., short-range wireless communication) or may communicate with an electronic device 104 or a server 108 over a second network 199 (e.g., long-range wireless communication). According to an example embodiment, the electronic device 101 may communicate with the electronic device 104 via the server 108. According to an example embodiment, the electronic device 101 may include a processor 120, a memory 130, an input device 150, an acoustic output device 155, a display device 160, an audio module 170, a sensor module 176, an interface 177, a haptic module 179, a camera module 180, a power management module 188, a battery 189, a communication module 190, a subscriber identity module 196, and an antenna module 197. In some example embodiments, at least one of the components (e.g., the display device 160 or the camera module 180) may be excluded from the electronic device 101 or another component may be additionally included in the electronic device 101. In some example embodiments, some components may be integrated with other components. For example, the sensor module 176 (e.g., a fingerprint sensor, an iris sensor, or an illumination sensor) is embedded in the display device 160 (e.g., a display).

For example, by executing software (e.g., a program 140), the processor 120 may control at least another component (e.g., a hardware or software component) of the electronic device 101 connected to the processor 120 and may process, and perform operations on, various pieces of data. The processor 120 may load instructions or data received from another component (e.g., the sensor module 176 or the communication module 190) into a volatile memory 132, process the loaded instructions or data, and store result data in a non-volatile memory 134. According to an example embodiment, the processor 120 may include a main processor 121 (e.g., a central processing unit or an application processor) and a coprocessor 123 (e.g., a graphics processing unit, an image signal processor, a sensor hub processor, or a communications processor) that is operated independently of the main processor 121 and that is additionally or alternatively configured to use lower power than the main processor 121 or specialized for a specified function. Here, the coprocessor 123 may be operated separately from the main processor or while embedded in the main processor 121.

In this case, on behalf of the main processor 121 while the main processor 121 is in an inactive (e.g., sleep) state, or together with the main processor 121 while the main processor 121 is in an active (e.g., application-in-execution) state, the coprocessor 123 may control at least some functions or states associated with at least one (e.g., the display device 160, the sensor module 176, or the communication module 190) of the components of the electronic device 101. According to an example embodiment, the coprocessor 123 (e.g., an image signal processor or a communications processor) may be implemented as a portion of another component (e.g., the camera module 180 or the communication module 190) that is functionally associated with the coprocessor 123. The memory 130 may store various pieces of data used by at least one component (e.g., the processor 120 or the sensor module 176) of the electronic device 101, such as software (e.g., the program 140) and input data or output data for an associated command. The memory 130 may include the volatile memory 132 or the non-volatile memory 134.

The program 140 is software stored in the memory 130 and may include, for example, an operating system 142, middleware 144, or an application 146.

The input device 150 is a device for receiving commands or data to be used by a component (e.g., the processor 120) of the electronic device 101 from the outside (e.g., a user) of the electronic device 101 and may include, for example, a microphone, a mouse, or a keyboard.

The acoustic output device 155 is a device for outputting an acoustic signal to the outside of the electronic device 101 and may include, for example, a speaker for general use such as multimedia playback or recording playback and a receiver for call reception only. According to an example embodiment, the receiver may be formed integrally with or separately from the speaker.

The display device 160 is a device for visually providing information to the user of the electronic device 101 and may include, for example, a display, a hologram device, or a projector, and a control circuit for controlling a corresponding device. According to an example embodiment, the display device 160 may include a touch circuitry or a pressure sensor capable of measuring touch pressure intensity.

The audio module 170 may perform bidirectional conversion between sound and electric signals. According to an example embodiment, the audio module 170 may acquire sound through the input device 150 or output sound through the acoustic output device 155 or an external electronic device (e.g., the electronic device 102, such as a speaker or a headphone) connected to the electronic device 101 in a wired or wireless manner.

The sensor module 176 may generate electric signals or data values corresponding to external environment states or internal operating states (e.g., power or temperatures) of the electronic device 101. The sensor module 176 may include, for example, a gesture sensor, a gyro sensor, an air pressure sensor, a magnetic sensor, an acceleration sensor, a grip sensor, a proximity sensor, a color sensor, an infrared (IR) sensor, a biosensor, a temperature sensor, a humidity sensor, or an illumination sensor.

The interface 177 may support a specified protocol for connecting to an external electronic device (e.g., the electronic device 102) in a wired or wireless manner. According to an example embodiment, the interface 177 may include a high definition multimedia interface (HDMI), a universal serial bus (USB) interface, a Secure Digital (SD) card interface, or an audio interface.

A connection terminal 178 may include a connector, such as an HDMI connector, a USB connector, an SD card connector, or an audio connector (e.g., a headphone connector), which can physically connect the electronic device 101 and an external electronic device (e.g., the electronic device 102).

The haptic module 179 may convert an electrical signal into a mechanical stimulus (e.g., vibration or movement) or an electrical stimulus that the user may perceive through a tactile or kinesthetic sense. The haptic module 179 may include, for example, a motor, a piezoelectric element, or an electrical stimulation device.

The camera module 180 may capture still images and videos. According to an example embodiment, the camera module 180 may include one or more lenses, an image sensor, an image signal processor, or a flash.

The power management module 188 is a module for managing power supplied to the electronic device 101 and may be configured, for example, as at least a portion of a power management integrated circuit (PMIC).

The battery 189 is a device for supplying power to at least one component of the electronic device 101 and may include, for example, a non-rechargeable primary battery, a rechargeable secondary battery, or a fuel cell.

The communication module 190 may establish a wired or wireless communication channel between the electronic device 101 and an external electronic device (e.g., the electronic device 102, the electronic device 104, or the server 108) and support communication through the established communication channel. The communication module 190 may include one or more communication processors that are operated independently of the processor 120 (e.g., an application processor) and that support wired communication or wireless communication. According to an example embodiment, the communication module 190 may include a wireless communication module 192 (e.g., a cellular communication module, a short range wireless communication module, or a global navigation satellite system (GNSS) communication module) or a wired communication module 194 (e.g., a local area network (LAN) communication module, or a power line communication module). Among the above communication modules, a corresponding communication module may be used to communicate with an external electronic device through a first network 198 (e.g., a short range communication network such as Bluetooth, WiFi direct, or Infrared Data Association (IrDA)) or a second network 199 (e.g., a long range communication network such as a cellular network, the Internet, or a computer network (e.g., a local area network (LAN) or a wide area network (WAN))). The above-described various kinds of communication modules 190 may be implemented as a single chip or separate individual chips.

According to an example embodiment, the wireless communication module 192 may identify and authenticate the electronic device 101 in a communication network by using user information stored in the subscriber identity module 196.

The antenna module 197 may include one or more antennas for externally transmitting or receiving signals or power. According to an example embodiment, the communication module 190 (e.g., the wireless communication module 192) may transmit or receive signals to or from an external electronic device through an antenna suitable for a communication scheme.

Some of the elements may be connected to each other via a communication scheme (e.g., a bus, a general purpose input/output (GPIO), a serial peripheral interface (SPI), or a mobile industry processor interface (MIPI) between peripherals to exchange signals (e.g., commands or data) between each other.

According to an example embodiment, the commands or data may be transmitted or received between the electronic device 101 and the external electronic device 104 through the server 108 connected to the second network 199. Each of the electronic devices 102 and 104 may be the same or a different type of device as or from the electronic device 101. According to an example embodiment, some or all actions that are executed by the electronic device 101 may be executed by anther external electronic device or a plurality of external electronic devices. According to an example embodiment, when the electronic device 101 should perform a certain function or service automatically or upon request, the electronic device 101 may request a function that is at least partially associated with the certain function or service from an external electronic device, instead of or in addition to autonomously running the function or service. When the request is received, the external electronic device may execute the requested function or an additional function and deliver a result of the execution to the electronic device 101. The electronic device 101 may provide the requested function or service by using as is or after additionally processing the received result. To this end, for example, cloud computing, distributed computing, or client-server computing technology may be used.

A processor according to various example embodiments of the present invention may include a plurality of cores (e.g., 230 in FIG. 2) capable of performing operations independently, a memory (e.g., 350 in FIG. 3) and a control circuit (e.g., 300 in FIG. 3) electrically connected to the plurality of cores 230 and the memory 350, wherein the control circuit 300 may be configured to acquire one or more instructions associated with a task to be processed using at least some of the plurality of cores 230, store data corresponding to the task in the memory 350 based on the one or more instructions, deliver at least some of the one or more instructions to the at least some cores 230, check one or more cores 230 that have responded to the at least some instructions among the at least some cores 230, prevent the task from being allocated to the cores except for one core to which the task is allocated, and allocate the task to one of the cores 230 when the task is not allocated to the cores 230, the allocation of the task including changing state information associated with the allocation and setting other cores not allocated the task among the plurality of cores not to access the data corresponding to the task. The control circuit 300 may be configured to allocate the task to a core that has first responded to the at least some instructions among the at least some cores 230. The control circuit 300 may include a queue storage device (e.g., 314 in FIG. 3) that stores and manages task instructions in a First-In-First-Out (FIFO) structure. The control circuit 300 may include an interrupt request (IRQ) control circuit 300 that generates an interrupt based on an event and delivers the task to one or more cores having responded to the at least some instructions. The memory 350 may be provided as a static random access memory (SRAM) and embedded in the control circuit 300. The control circuit 300 may include an SRAM address controller (e.g., 317 in FIG. 3) configured to automatically allocate an address for storing the data corresponding to the task and store the data corresponding to the task in the allocated address of the memory 350 in response to the acquisition of the one or more instructions associated with the task to be processed. The control circuit 300 may be configured to preferentially allocate the task to one or more cores designated based on priority set by s user. The plurality of cores may be provided as a plurality of different DSPs.

An architecture (e.g. 200 in FIG. 2) according to various example embodiments of the present invention may include a plurality of cores (e.g., 230 in FIG. 2) composed of a plurality of different DSPs or at least one hardware accelerator and a control circuit (e.g., 300 in FIG. 3) electrically connected to the plurality of cores, wherein the control circuit 300 is configured to receive a task processing request from at least some of the plurality of cores, store instructions and information associated with the task in an internal memory 350, deliver at least some of the instructions associated with the task to the plurality of cores in an event form, and allocate the task to a core that has first responded to the at least some instructions among the plurality of cores. When the task is allocated to one of the plurality of cores 230, the control circuit 300 may be configured not to allocate the task to the other cores 230. The allocation of the task by the control circuit 300 may include changing state information associated with the allocation and preventing the other cores from accessing data corresponding to the task. The control circuit 300 may include a queue storage device (e.g., 314 in FIG. 3) that stores and manages task instructions in a FIFO structure.

Figure 2:
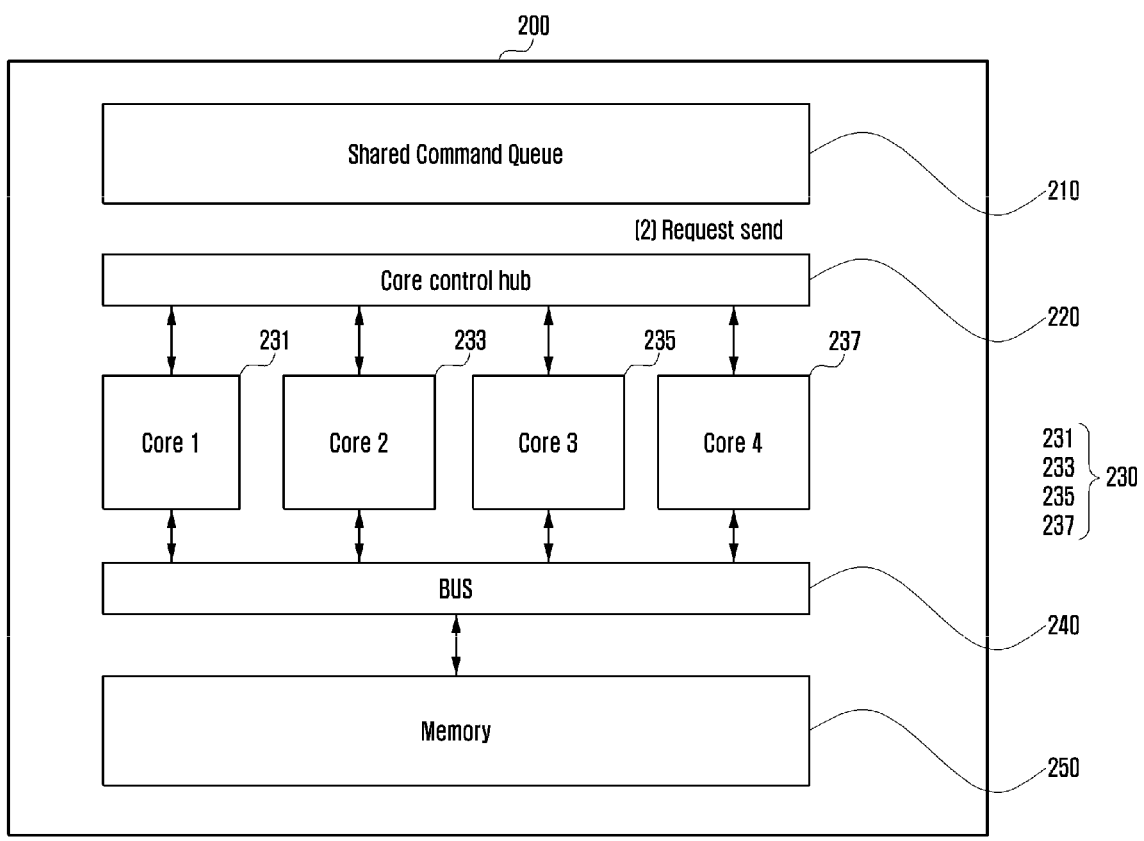
FIG. 2 is a block diagram showing an architecture according to various example embodiments of the present invention.

FIG. 2 is a block diagram showing an architecture 200 according to various example embodiments of the present invention. According to an example embodiment, the architecture 200 shown in FIG. 2 may be the same as or similar to the processor 120 shown in FIG. 1. In some example embodiments, the architecture 200 shown in FIG. 2 may be at least an element included in the processor 120 shown in FIG. 1.

Referring to FIG. 2, the architecture 200 may include a plurality of cores 230 for performing operations independently, a memory 250, and a control circuit 210 electrically connected to the plurality of cores 230 and the memory 250. According to an example embodiment, the architecture 200 may further include a core control hub 220 that connects the control circuit 210 to the plurality of cores 230, or a bus 240 that connects the plurality of cores 230 to the memory 250.

According to an example embodiment, the plurality of cores 230 may be provided as a plurality of different DSPs or at least one hardware accelerator. According to an example embodiment, the plurality of cores 230 may be configured to process signals or information provided from other devices (e.g., the audio module 170, the sensor module 176, the haptic module 179, or the camera module 180 of FIG. 1) included in an electronic device (e.g., the electronic device 101 of FIG. 1). For example, tasks processed by the plurality of cores 230 may include a function of extracting information from signals provided from other devices (e.g., the audio module 170, the sensor module 176, the haptic module 179, or the camera module 180 of FIG. 1) included in an electronic device (e.g., the electronic device 101 of FIG. 1), a function of changing details or characteristics of information, a voice coding function for digitalizing a voice signal, a digital filter function, or a function of processing sounds or videos.

According to an example embodiment, the plurality of cores 230 may perform operations independently to perform the functions. For example, the plurality of cores 230 may be provided as a plurality of different DSPs or at least one hardware accelerator. In FIG. 2, the plurality of cores 230 are illustrated as a first core 231, a second core 233, a third core 235, and a fourth core 237, which are four cores that perform operations independently. However, there is no limitation on the number of cores in the present invention.

According to an example embodiment, the memory 250 may be configured to store data corresponding to the task. According to an example embodiment, the memory 250 may be installed in the control circuit 210. According to an example embodiment, the memory 250 may be provided as an SRAM.

According to an example embodiment, the control circuit 210 may be configured to receive a task processing request from the plurality of cores 230 and distribute received tasks to the plurality of cores 230. According to an example embodiment, the control circuit 210 may be a circuit that manages tasks requested by the plurality of cores 230.

According to an example embodiment, the control circuit 210 may deliver a task requested by a specific core to a plurality of cores in an interrupt event form and may receive responses to the interrupt event from at least some of the plurality of cores. According to an example embodiment, the control circuit 210 may allocate the requested task to a core that has first responded among the plurality of cores. For example, the control circuit 210 may transmit an interrupt event associated with the task to the first to fourth cores 231, 233, 235, and 237 in response to reception of a task processing request from the first core 231. When the response is first received from the third core 235 among the first to fourth cores 231, 233, 235, and 237, the control circuit 210 may allocate the task to the third core 235. According to an example embodiment, the allocation of the task by the control circuit 210 may include transmitting instructions associated with the task or data corresponding to the task to the core that has first responded among the plurality of cores 230. According to an example embodiment, the core to which the task is allocated, for example, the third core 235 may perform a function associated with the allocated task.

According to an example embodiment, the control circuit 210 may determine a priority for the task based on a user's settings. For example, a task designated from among a plurality of tasks may have to be preferentially processed compared to the other tasks. For example, while the control circuit 210 sequentially stores a first task, a second task, and a third task received from the plurality of cores 230, the control circuit 210 may receive a request to process a fourth task having priority. In this case, the control circuit 210 may adjust a queue order so that the fourth task is processed prior to the first to third tasks.

According to an example embodiment, the control circuit 210 may match a specific task to a specific core. For example, the control circuit 210 may set a designated core to process at least some of the plurality tasks.

According to an example embodiment, the control circuit 210 may adjust a task allocation time considering dependency between tasks. For example, there may be dependency between a plurality of tasks. For example, the second task may have to be processed after the first task is processed. In this case, by designating a wait task after processing the first task, the control circuit 210 may enable the second task to be processed after the processing of the first task is complete.

The control circuit 210 according to various example embodiments of the present invention shares queues associated with the task with the plurality of cores 230 and manages the queues. Hereinafter, the control circuit 210 is defined as a shared command queue (SCQ) circuit.

Figure 3:
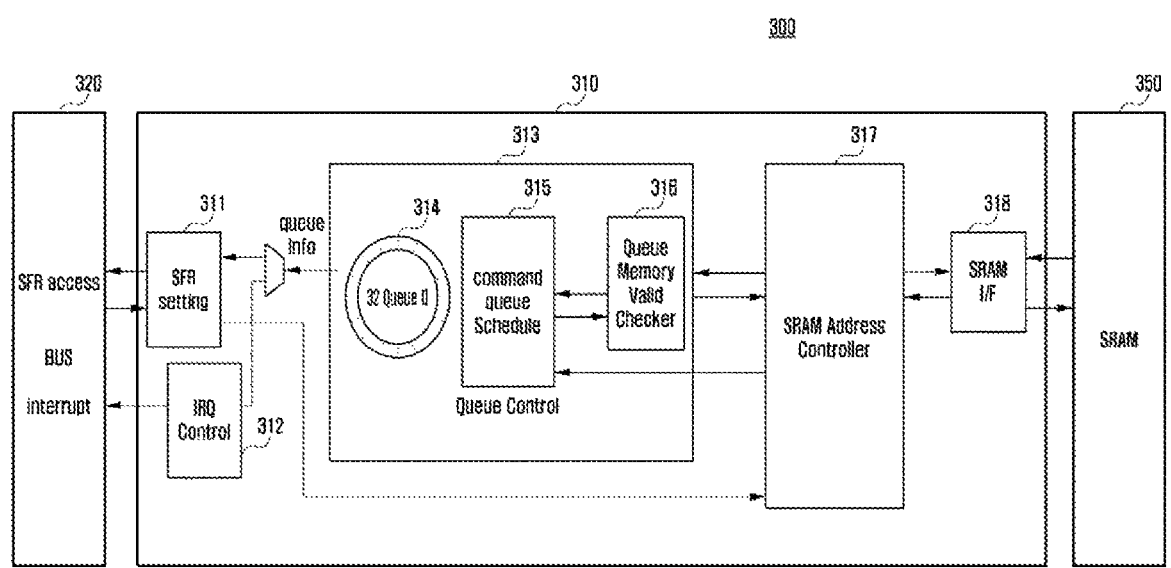
FIG. 3 is a block diagram of a control circuit according to various example embodiments of the present invention.

FIG. 3 is a block diagram of a control circuit according to various example embodiments of the present invention.

Referring to FIG. 3, an SCQ circuit 300 (e.g., the SCQ circuit 210 of FIG. 2) according to various example embodiments of the present invention may include a main circuit 310, a bus 320 (e.g., the core control hub 220 of FIG. 2) configured to connect the main circuit 310 to a plurality of cores (e.g., the plurality of cores 230 of FIG. 2) or an internal memory 350 provided as an SRAM.

According to an example embodiment, the main circuit 310 may include a special function register (SFR) setting circuit 311 connected to the bus 320 to control the plurality of cores 230, an IRQ control circuit 312 configured to transmit an IRQ to the plurality of cores 230, an SRAM address controller 317, an SRAM interface 318, and a queue control circuit 313. According to an example embodiment, the queue control circuit 313 may include a queue storage device 314, a queue schedule circuit 315, and a queue memory validity checker 316.

According to an example embodiment, the plurality of cores 230 may share the task with one another through the SCQ circuit 300. According to an example embodiment, the SCQ circuit 300 stores and manages tasks received from the plurality of cores 230. For example, the SCQ circuit 300 may be configured to store and manage tasks. According to an example embodiment, the SCQ circuit 300 may store task instructions and data associated with tasks (task information). For example, the SCQ circuit 300 may be configured to store up to 32 tasks through the queue storage device 314. According to various example embodiments, the number of tasks the queue storage device 314 stores may be greater than up to 32.

According to an example embodiment, one task may include one instruction or may include a plurality of instructions. For example, one task may include one piece of task information or may include 10 pieces of task information.

According to an example embodiment, the queue storage device 314 may store task instructions in a FIFO structure.

According to an example embodiment, the SCQ circuit 300 may include an internal memory 350 having up to 8 Kbyte to store the task information. For example, the SCQ circuit 300 may store task instructions received from at least one of the plurality of cores 230 in the queue storage device 314 and may store data associated with the task (task information) in the SRAM, which is the internal memory 350.

According to an example embodiment, the SCQ circuit 300 may sequentially store the received task instructions and may allocate the task instructions to the plurality of cores 230 in the order in which the task instructions are stored. According to another example embodiment, the SCQ circuit 300 may be configured to allocate the task to the plurality of cores 230 based on priority set by a user.

According to an example embodiment, the SRAM address controller 317 may be configured to store task information in the internal memory 350 based on the control of the queue control circuit 313. For example, the SRAM address controller 317 may automatically generate an address based on the control of the queue control circuit 313 and may store task information in the internal memory 350 in accordance with the generated address. According to an example embodiment, the SRAM address controller 317 may search the internal memory 350 for a memory space where no data is stored in order to store the task information and may allocate the memory space, generate a storage address, and deliver the storage address to the queue control circuit 313.

According to an example embodiment, the IRQ control circuit 312 may be configured to generate an interrupt based on an event and deliver the task instructions and the task information stored in the SCQ circuit 300 to the plurality of cores 230.

According to an example embodiment, the SFR setting circuit 311 may be configured to transmit an interrupt request to the plurality of cores 230 based on a user's request or transmit an interrupt request to some cores designated from among the plurality of cores 230.

A task processing method of a processor including a plurality of cores (e.g., 230 in FIG. 2) capable of performing operations independently, a memory (e.g., 350 in FIG. 3) and a control circuit (e.g., 300 in FIG. 3) electrically connected to the plurality of cores 230 and the memory 350 according to various example embodiments of the present invention may include acquiring one or more instructions associated with a task to be processed using at least some of the plurality of cores 230, storing data corresponding to the task in the memory 350 based the one or more instructions, delivering at least some of the instructions to the at least some cores 230, checking one or more cores 230 that have responded to the at least some instructions among the at least some cores 230, preventing the task from being allocated to the cores except for one core to which the task is allocated, and allocating the task to one of the cores 230 when the task is not allocated to the cores 230, the allocation of the task including changing state information associated with the allocation and setting the other cores not to access the data corresponding to the task. Restated, the control circuit 300 may receive responses from a first core 230 and a group of second cores 230. The control circuit may then prevent the task from being allocated to each core 230 in the group of second cores 230 and allocate the task to the first core 230. The group of second cores 230 may include each core that responded to at least some instructions except for the first core 230.

The task processing method may further include allocating the task to a core that has first responded to the at least some instructions among the at least some cores 230. The storing of the data corresponding to the task in the memory 350 may include storing task instructions in the queue storage device 314 having a FIFO structure. The task processing method may include, by the control circuit 300, generating an interrupt based on an event and delivering the task to one or more cores having responded to the at least some instructions by means of an IRQ control circuit 300. The memory 350 may be provided as an SRAM and embedded in the control circuit 300. The task processing method may include, by the control circuit 300, automatically allocating an address for storing the data corresponding to the task and storing the data corresponding to the task in the allocated address of the memory 350 in response to the acquisition of the one or more instructions associated with the task to be processed by means of the SRAM address controller 317. The task processing method may include preferentially allocating the task to one or more designated cores based on priority set by a user. The plurality of cores may be provided as a plurality of different DSPs.

Figure 4:
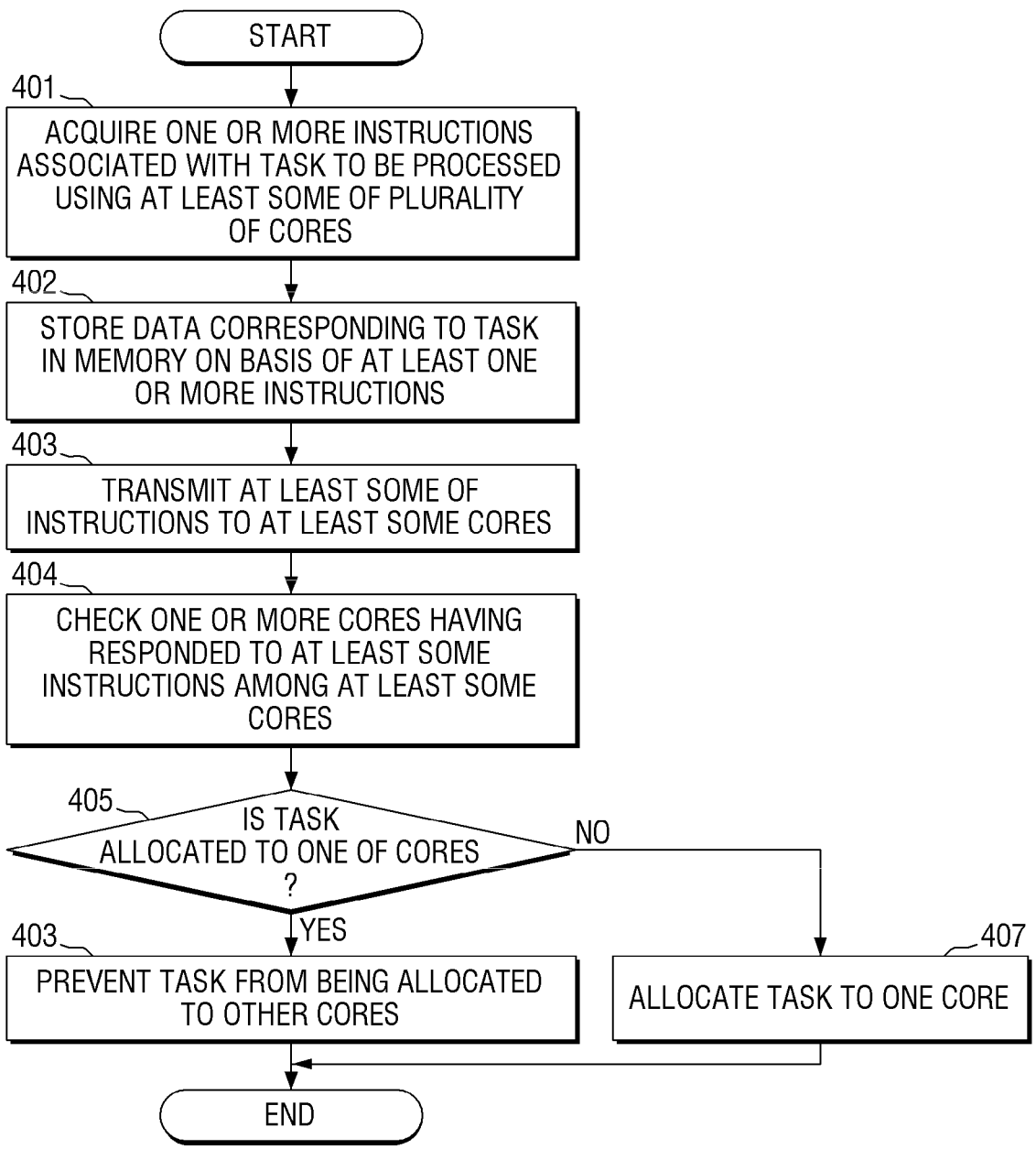
FIG. 4 is an operational flowchart of an architecture according to various example embodiments of the present invention.

FIG. 4 is an operational flowchart of an architecture (e.g., 200 in FIG. 2) according to various example embodiments of the present invention.

Referring to FIG. 4, a SCQ circuit (e.g., 300 in FIG. 3) according to an example embodiment may acquire one or more instructions associated with a task to be processed using at least some of a plurality of cores (e.g., 230 in FIG. 2) in operation 401. For example, the SCQ circuit 300 may receive a task processing request from at least some of the plurality of cores 230.

In operation 402, the SCQ circuit 300 according to an example embodiment may store data corresponding to the task in a memory (e.g., 350 in FIG. 3) based on one or more instructions included in the received task.

In operation 403, the SCQ circuit 300 according to an example embodiment may deliver at least some of the instructions associated with the received task to the at least some cores.

In operation 404, the SCQ circuit 300 according to an example embodiment may check one or more cores that have responded to the at least some instructions among the at least some cores.

In operations 405 and 406, when the task is allocated to one of the cores, the SCQ circuit 300 according to an example embodiment may not allocate the task to the other cores, which are different from the one of the plurality of cores.

In operation 407, the SCQ circuit 300 according to an example embodiment may allocate the task to one of the cores when the task is not allocated to the cores. According to an example embodiment, the allocation of the task by the SCQ circuit 300 may include changing state information associated with the allocation and preventing the other cores from accessing data corresponding to the task.

Figure 5:
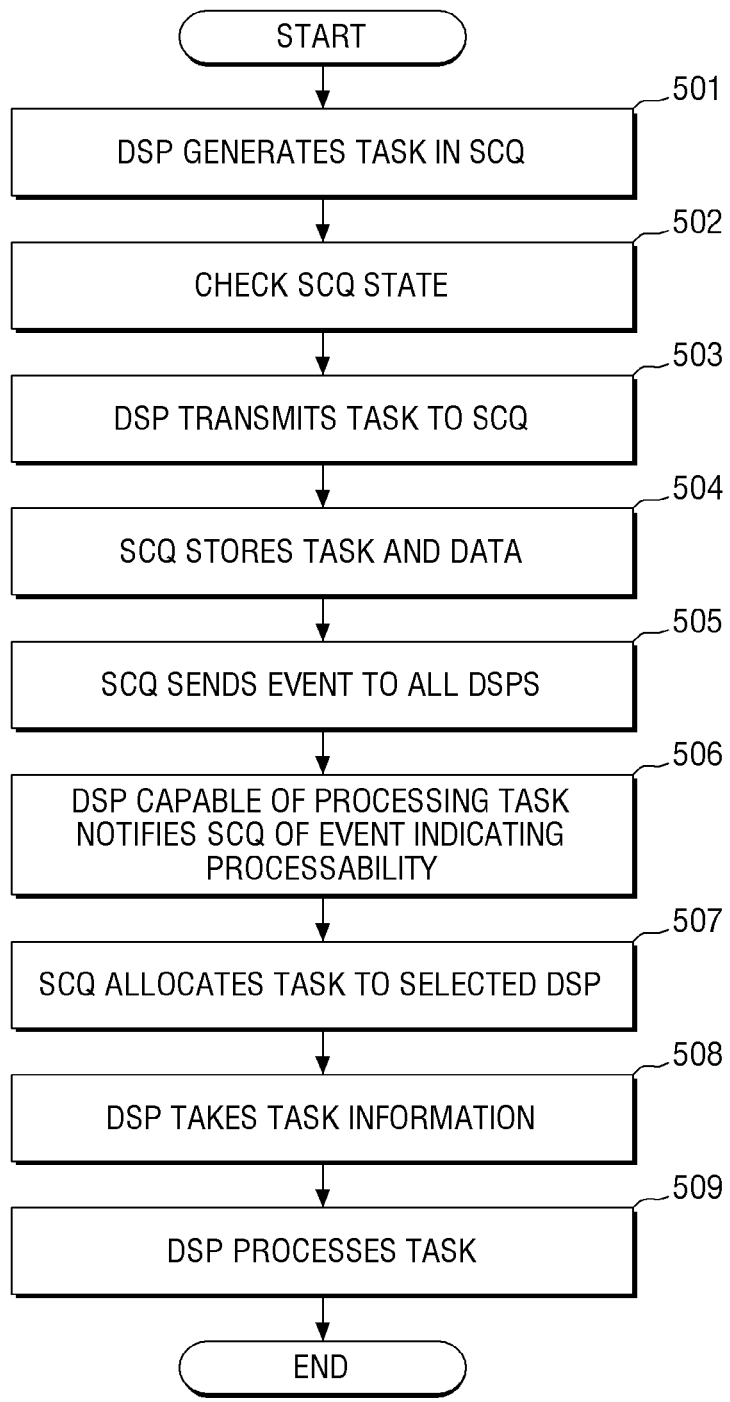
FIG. 5 is an operational flowchart illustrating a task processing process of an architecture according to various example embodiments of the present invention.

FIG. 5 is an operational flowchart illustrating a task processing process of an architecture (e.g., 200 in FIG. 2) according to various example embodiments of the present invention.

Referring to FIG. 5, in operation 501, at least some of a plurality of cores (e.g., 230 in FIG. 2) according to an example embodiment may generate tasks and deliver the generated tasks to an SCQ circuit (e.g., 300 in FIG. 3). For example, the SCQ circuit 300 may receive a task processing request from at least some of the plurality of cores 230.

In operations 502 and 503, the SCQ circuit 300 according to an example embodiment may check (determine) whether to accommodate a corresponding task and deliver a result of the check to the plurality of cores 230 in response to the reception of the task processing request from at least some of the plurality of cores 230. For example, the SCQ circuit 300 may be configured to store up to 32 tasks through the queue storage device 314 and store up to 8-Kbyte task data. According to an example embodiment, as described above, when the number of accommodable tasks exceeds a designated number or when a designated memory storage space is full, the SCQ circuit 300 may determine that no more task data can be accommodated. According to an example embodiment, when it is determined that no more task can be accommodated, the SCQ circuit 300 may deliver corresponding information to the plurality of cores 230. According to an example embodiment, the plurality of cores 230 may be configured to transmit a task processing request to the SCQ circuit 300 again at a predetermined time after receiving an event indicating that no more task can be accommodated from the SCQ circuit 300. According to an example embodiment, when an event indicating that a task can be accommodated is received from the SCQ circuit 300, the plurality of cores 230 may deliver task instructions and task data to the SCQ circuit 300.

In operation 504, the SCQ circuit 300 according to an example embodiment may sequentially store the received task instructions. For example, the SCQ circuit 300 may store the task instructions in a queue storage device (e.g., 314 in FIG. 3), which has a FIFO structure, and may store the task data in an internal memory (e.g., 350 in FIG. 3) using an SRAM address controller (e.g., 317 in FIG. 3).

In operations 505 and 506, the SCQ circuit 300 according to an example embodiment may deliver at least some of the task instructions to all of the plurality of cores 230. When the instructions are received, each of the plurality of cores 230 may transmit an event indicating whether to be able to process the task to the SCQ circuit 300.

In operation 507, the SCQ circuit 300 according to an example embodiment may check one or more cores that have responded to the at least some instructions among all of the plurality of cores 230 and may allocate the task to the one or more cores. According to an example embodiment, the SCQ circuit 300 may sequentially store the received task instructions and may allocate the task instructions to the plurality of cores 230 in the order in which the task instructions are stored. According to another example embodiment, the SCQ circuit 300 may be configured to allocate the task to the plurality of cores 230 based on priority set by a user.

In operations 508 and 509, according to an example embodiment, the cores to which the task is allocated may receive task data from the SCQ circuit 300 and may process a received task.

Figure 6:
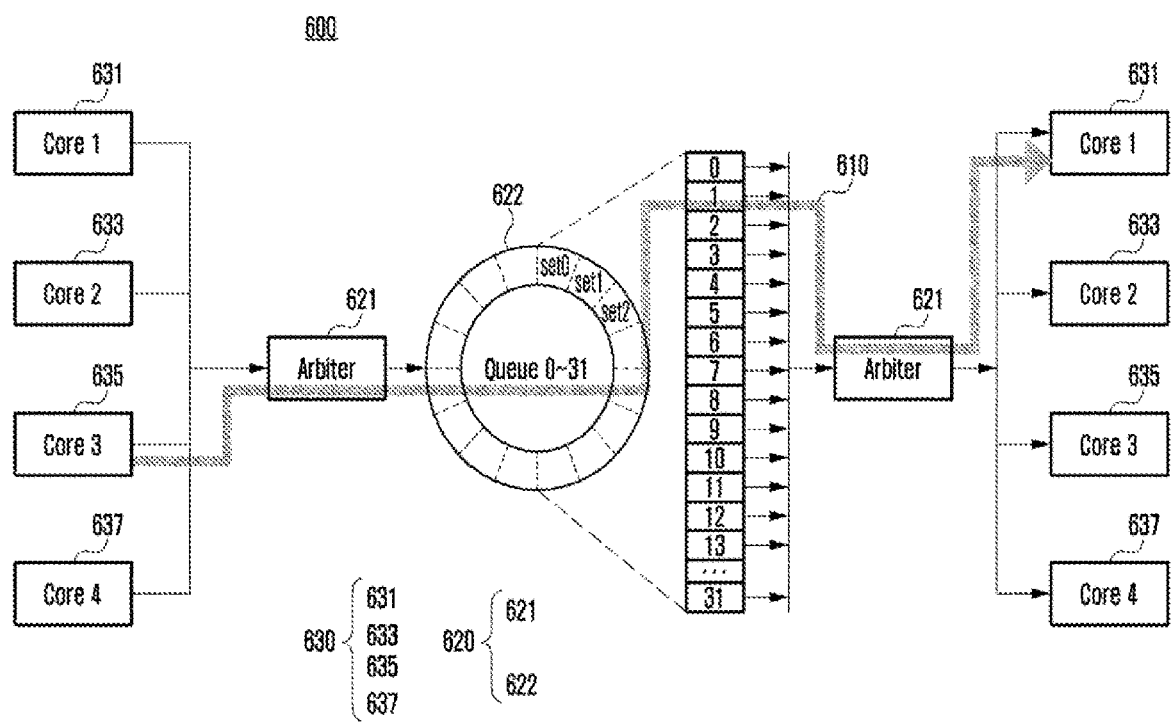
FIG. 6 is an example diagram illustrating a process of an SCQ circuit allocating a task requested by at least some cores to other cores.

FIG. 6 is an example diagram illustrating a process of an SCQ circuit allocating a task requested by at least some cores to other cores.

Referring to FIG. 6, an architecture (e.g., 200 in FIG. 2) according to an example embodiment of the present invention may include a plurality of cores 630 (e.g., 230 in FIG. 2) capable of performing operations independently and an SCQ circuit 620 (e.g., 300 in FIG. 3). According to an example embodiment, the plurality of cores 630 may include first to fourth cores 631, 633, 635, and 637 provided as a plurality of different DSPs or at least one hardware accelerator.

According to an example embodiment, the SCQ circuit 620 may deliver a task requested by a specific core to a plurality of cores in an interrupt event form and may receive responses to the interrupt event from at least some of the plurality of cores. According to an example embodiment, the SCQ circuit 620 may allocate the requested task to a core that has first responded among the plurality of cores. For example, a process of the SCQ circuit 620 allocating the task requested by the at least some cores to other cores may be represented as an arrow 610 of FIG. 6. When a task processing request is received from the third core 635, an arbiter circuit 621 (e.g., the queue control circuit 313 of FIG. 3) of the SCQ circuit 620 may sequentially store received tasks in a queue storage device 622 (e.g., 314 in FIG. 3) and may transmit an interrupt event associated with the task to the first to fourth cores 631, 633, 635, and 637. When the response is first received from the first core 631 among the first to fourth cores 631, 633, 635, and 637, the SCQ circuit 620 may allocate the task to the first core 631. The core to which the task is allocated, for example, the first core 631 may perform a function associated with the allocated task.

Figure 7:
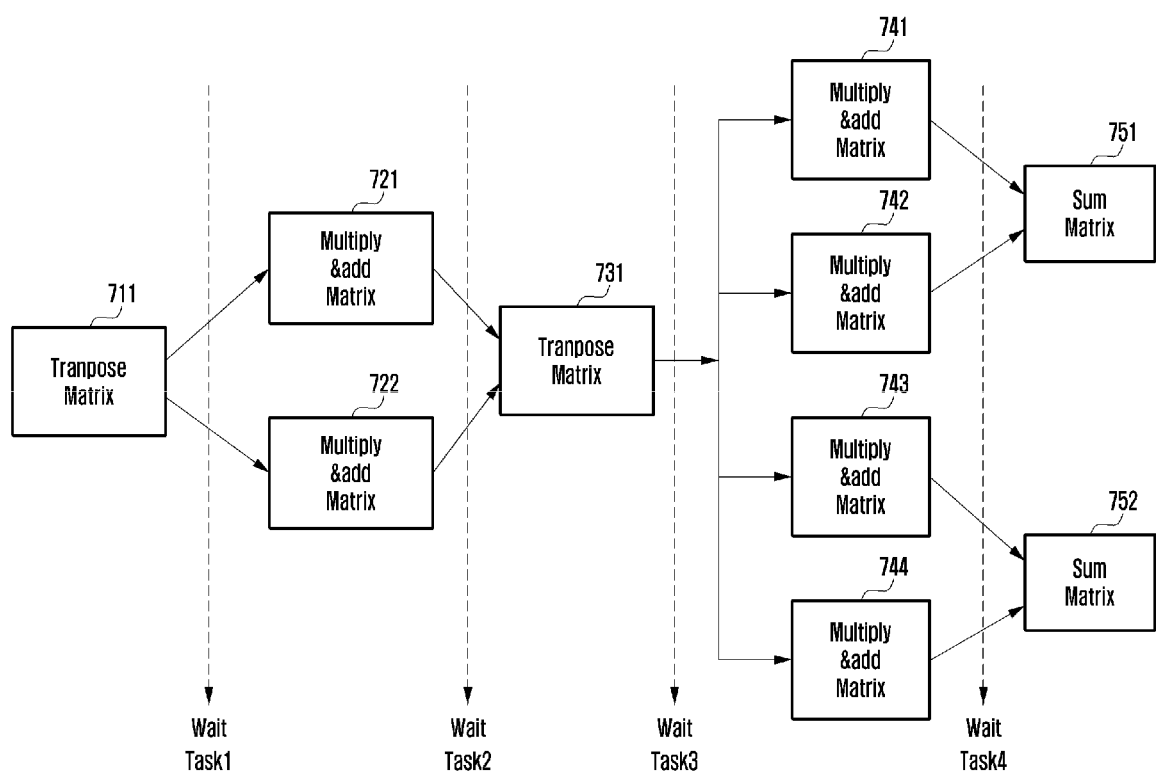
FIG. 7 is an example diagram illustrating a method of the SCQ circuit allocating a task considering dependency between tasks.
Figure 8:
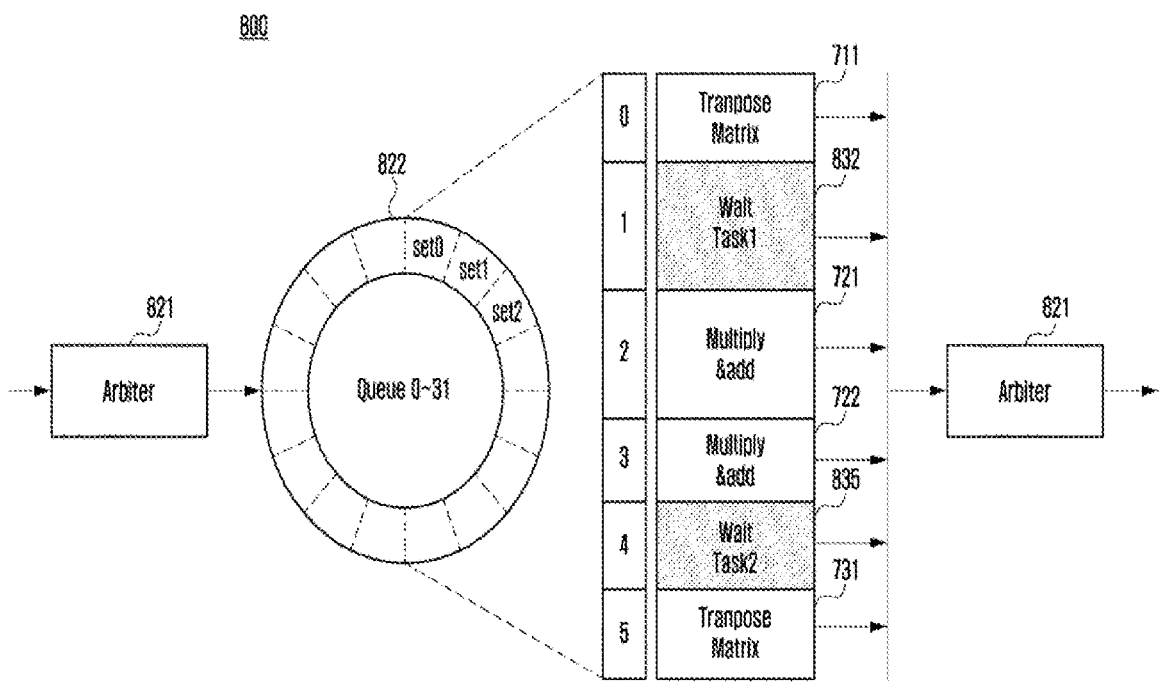
FIG. 8 shows an example in which the SCQ circuit sets a wait task.

FIG. 7 is an example diagram illustrating a method of the SCQ circuit allocating a task considering dependency between tasks. FIG. 8 shows an example in which the SCQ circuit sets a wait task.

According to an example embodiment, FIG. 7 may be an example of a 2D discrete Fourier transform (DFT) algorithm. The dependency may be present between tasks as shown in FIG. 7 when the tasks are performed by an architecture (e.g., 200 in FIG. 2) according to various example embodiments of the present invention. For example, tasks corresponding to block 721 and block 722 may have to be processed after a task corresponding to block 711 is processed. Alternatively, a task corresponding to block 731 may have to be processed after the tasks corresponding to block 721 and block 722 are processed. Alternatively, tasks corresponding to block 741, block 742, block 743, and block 744 may have to be processed after the task corresponding to block 731 is processed. Alternatively, tasks corresponding to block 751 and block 752 may have to be processed after the tasks corresponding to block 741, block 742, block 743, and block 744 are processed.

Referring to FIGS. 7 and 8, an SCQ circuit 800 (e.g., 300 in FIG. 3) according to various example embodiments of the present invention may set a wait task considering the dependency between tasks. For example, an arbiter circuit 821 (e.g., the queue control circuit 313 of FIG. 3) of the SCQ circuit 800 may designate wait task1 832 for a queue storage device 822 (e.g., 314 in FIG. 3) so that the other tasks are not processed until the task corresponding to block 711 of FIG. 7 is processed.

Alternatively, the arbiter circuit 821 of the SCQ circuit 800 may designate wait task2 835 for the queue storage device 822 so that the other tasks are not processed until the tasks corresponding to blocks 721 and 722 of FIG. 7 are processed.

Alternatively, the arbiter circuit 821 of the SCQ circuit 800 may designate wait task3 for the queue storage device 822 so that the other tasks are not processed until the task corresponding to block 731 is processed.

Alternatively, the arbiter circuit 821 of the SCQ circuit 800 may designate wait task4 for the queue storage device 822 so that the other tasks are not processed until the tasks corresponding to blocks 741, 742, 743, and 744 are processed.

Figure 9:
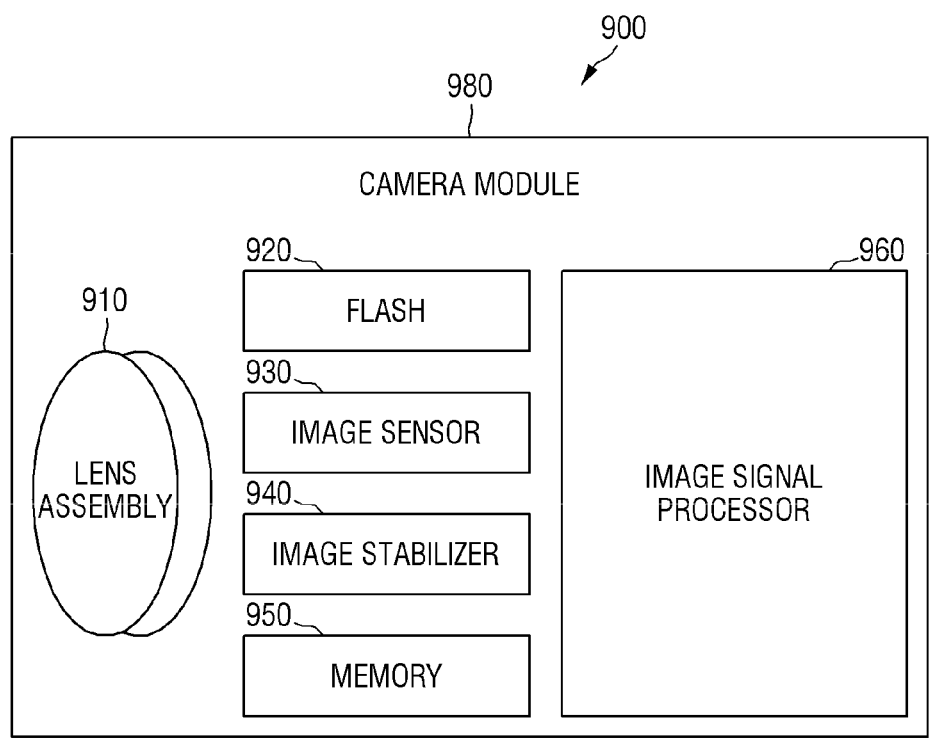
FIG. 9 is a block diagram of a camera module according various example embodiments.

FIG. 9 is a block diagram 900 of a camera module 980 (e.g., 980 in FIG. 1) according various example embodiments. Referring to FIG. 9, the camera module 980 may include a lens assembly 910, a flash 920, an image sensor 930, an image stabilizer 940, a memory 950 (e.g., a buffer memory), or an image signal processor 960. The lens assembly 910 may collect light emitted from a subject to be imaged. The lens assembly 910 may include one or more lenses. According to an example embodiment, the camera module 980 may include a plurality of lens assemblies 910. In this case, the camera module 980 may be, for example, a dual camera, a 360 degree camera, or a spherical camera. The plurality of lens assemblies 910 may have the same lens attributes (e.g., angle of view, focal length, auto-focus, f-number, or optical zoom). Alternatively, at least one of the lens assemblies may have at least one different lens attribute from the other lens assemblies. The lens assembly 910 may include, for example, a wide-angle lens or a telephoto lens. The flash 920 may emit a light source used to strengthen light emitted from a subject. The flash 920 may include one or more light emitting diodes (e.g., a red-green-blue (RGB) LED, a white LED, an infrared LED, or an ultraviolet LED) or a xenon lamp.

The image sensor 930 may convert light delivered from a subject through the lens assembly 910 into electric signals to acquire an image corresponding to the subject. According to an example embodiment, the image sensor 930 may include one image sensor selected from among images sensors with different attributes such as an RGB sensor, a black and white (BW) sensor, an infrared (IR) sensor, or an ultraviolet (UV) sensor, a plurality of image sensors having the same attributes, or a plurality of image sensors having different attributes. For example, each of the image sensors included in the image sensor 930 may be implemented as a charged coupled device (CCD) sensor or a complementary metal oxide semiconductor (CMOS) sensor.

In response to movement of the camera module 980 or movement of the electronic device 101 including the camera module 980, the image stabilizer 940 may move in a specific direction or control (e.g., adjust read-out timing) the image sensor 930 or at least one lens included in the lens assembly 910 in order to partially compensate for a negative influence (e.g., image blur) of the movement on an captured image. According to an example embodiment, the image stabilizer 940 may be implemented as, for example, an optical image stabilizer. The movement may be detected by means of a gyro sensor (not shown) or an acceleration sensor (not shown) located inside or outside the camera module 980.

For the purpose of a next image processing task, the memory 950 may at least temporarily store at least a portion of the image acquired through the image sensor 930. For example, when an image acquisition according to a shutter is delayed or when a plurality of images are acquired at high speed, an acquired original image (e.g., a high-resolution image) may be stored in the memory 950, and a corresponding copy image (e.g., a low-resolution image) may be previewed through the display device 160. Subsequently, when specified conditions are satisfied (e.g., a user input or a system command), at least some original images stored in the memory 950 may be acquired and processed by, for example, the image signal processor 960. According to an example embodiment, the memory 950 may be provided as at least a portion of the memory 130 or as a separate memory operated independently.

The image signal processor 960 may perform image processing (e.g., depth map creation, 3D modeling, panorama creation, feature point extraction, image synthesis, or image compensation (e.g., noise reduction, resolution adjustment, brightness adjustment, blurring, sharpening, or softening)) on an image acquired through the image sensor 930 or an image stored in the memory 950. Additionally or alternatively, the image signal processor 960 may perform control (e.g., exposure time control or read-out timing control) of at least one element (e.g., the image sensor 930) included in the camera module 980. The image processed by the image signal processor 960 may be stored in the memory 950 again for the purpose of additional processing or may be delivered to external elements (e.g., the memory 130, the display device 160, the electronic device 102, the electronic device 104, or the server 108 of FIG. 1) of the camera module 980. According to an example embodiment, the image signal processor 960 may be provided as at least a portion of a processor (e.g., 120 in FIG. 1) or as a separate processor operated independently of the processor 120. When the image signal processor 960 is provided as a separate processor, the images processed by the image signal processor 960 may be displayed through a display device (e.g., 160 in FIG. 1) without or after additional image processing performed by the processor 120.

According to an example embodiment, the electronic device (e.g., 101 in FIG. 1) may include two or more camera modules 980 having different attributes or functions. In this case, for example, at least one of the camera modules 980 may be a wide-angle camera or a front camera, and at least another one of the camera modules 980 may be a telephoto camera or a rear camera.

According to various example embodiments of the present invention, the following effects can be obtained.

By the SCQ circuit managing and sharing tasks originating from a plurality of DSPs, it is possible to increase task processing speed and task management efficiency.

The SCQ circuit operates fast because a separate lock algorithm does not need to be applied to deliver tasks. The lock algorithm, which is an algorithm that does not allow cores other than a specific DSP core to which a task is allocated to access task data, causes degradation of performance.

The SCQ circuit uses an SRAM that stores task data, and thus has a fast processing speed because a main memory does not need to be used to deliver tasks.

The SCQ circuit does not have a master-slave structure, and thus tasks may be applied to all of the DSP cores.

Various types of devices may be provided as the electronic device according to various example embodiments disclosed herein. The electronic device may include at least one of, for example, a portable communication device (e.g., a smartphone), a computer device, a portable multimedia device, a portable medical device, a camera, a wearable device, or a home appliance. The electronic device according to an example embodiment disclosed herein is not limited to the above-described devices.

It should be understood that there is no intent to limit the present disclosure to the particular forms disclosed herein; rather, the present disclosure should be construed to cover various modifications, equivalents, and/or alternatives of example embodiments. In describing the drawings, similar reference numerals may be used to designate similar constituent elements. As used herein, singular forms may include plural forms as well unless the context clearly indicates otherwise. In the present disclosure, the expressions "A or B," "at least one of A and/or B," "A, B or C," and "at least one of A, B and/or C" may include all possible combinations of the items listed. Expressions, such as "a first", "a second", "the first", or "the second", used herein may express various elements regardless of the order and/or the importance of the elements. Such expressions are used to distinguish one element from other elements, but do not limit the corresponding elements. It should be understood that when an element (e.g., first element) is referred to as being (operatively or communicatively) "coupled," or "connected," to another element (e.g., second element), the first element may be coupled or connected directly to the second element or any other element (e.g., third element) may be interposed between the two elements.

The term "module" used in this disclosure may refer to a unit provided as hardware, software, or firmware. For example, the term "module" may be interchangeable with a term such as a logic, logical block, component, or circuit. A module may be an integrated component, or a minimum unit or a part of the minimum unit which performs one or more particular functions. For example, a module may be provided as an application-specific integrated circuit (ASIC).

Various example embodiments disclosed herein may be implemented as software (e.g., the program 140) including instructions stored in a storage medium (e.g., an internal memory 136 or an external memory 138) readable by a machine (e.g., a computer). The machine, which is a device capable of calling an instruction stored in the storage medium and operating according to the called instruction, may include the electronic device (e.g., the electronic device 101) according to the disclosed example embodiments. When the instruction is executed by a processor (e.g., the processor 120), the processor may perform a function corresponding to the instruction directly or by means of other components under the control of the processor. The instruction may contain codes created or executed by a compiler or an interpreter. The machine-readable storage medium may be provided in the form of a non-transitory storage medium. Here, the term "non-transitory" denotes that the storage medium does not include signals and is tangible, irrespective of whether data is semi-permanently or temporarily stored in the storage medium.

According to an example embodiment, the method according to various example embodiments disclosed herein may be included in a computer program product. The computer program product may be traded between a seller and a purchaser as a commodity. The computer program product may be distributed in the form of a machine-readable storage medium (e.g., a compact disc read only memory (CD-ROM)) or distributed online through an application store (e.g., PlayStore™). For online distribution, at least a portion of the computer program product may be at least temporarily stored in a storage medium such as a memory of a manufacturer's server, an application store's server, or a relay server or may be provisionally generated.

Each of the components (e.g., modules or programs) according to various example embodiments may be composed of a single entity or a plurality of entities, and some of the aforementioned subcomponents may be omitted, or other subcomponents may be further included in various example embodiments. Alternatively or additionally, some components (e.g., modules or programs) may be integrated into one entity to perform the same or similar functions performed by each respective component prior to integration. Operations performed by a module, a program, or other elements according to various example embodiments of the present disclosure may be executed sequentially, in parallel, repeatedly, or in a heuristic method. Also, some operations may be executed in different sequences or may be omitted, or other operations may be added.

What is claimed is:

1. A processor comprising:
   a plurality of cores configured to perform operations independently;
   a memory; and
   a control circuit electrically connected to the plurality of cores and the memory, the control circuit configured to
      acquire one or more first instructions, the one or more first instructions being associated with a first task to be processed using at least one of the plurality of cores,
      store data corresponding to the first task in the memory based on the one or more first instructions,
      transmit an event, including at least one of the acquired one or more first instructions to at least two cores from among the plurality of cores,
      check, in response to receiving a response to the event from one or more cores of the at least two cores, whether the one or more cores that have responded to the event are able to process the transmitted one or more first instructions,
      allocate the first task to one core among the one or more cores that have responded and are able to process the transmitted one or more first instructions, if the first task is not allocated to the plurality of cores, and
      prevent the first task from being allocated to the plurality of cores except for the one core if the first task is allocated to the one core,
      wherein the allocation of the first task includes changing state information associated with the allocation and setting other cores to which the first task is not allocated, from among the plurality of cores, not to access the data corresponding to the first task.

2. The processor of claim 1, wherein the one core is first among the one or more cores that have responded to the at least one of the one or more first instructions.

3. The processor of claim 1, wherein the control circuit includes a queue storage device configured to store and manage task instructions in a First-In-First-Out (FIFO) structure.

4. The processor of claim 1, wherein the control circuit comprises an interrupt request (IRQ) control circuit configured to generate an interrupt based on an event and transmit the first task to the one or more cores having responded to the at least one of the one or more first instructions.

5. The processor of claim 1, wherein the memory is a static random access memory (SRAM) and is embedded in the control circuit.

6. The processor of claim 5, wherein the control circuit includes an SRAM address controller configured to allocate an address for storing the data corresponding to the first task and store the data corresponding to the first task in the allocated address of the memory in response to the acquisition of the one or more first instructions associated with the first task to be processed.

7. The processor of claim 1, wherein the control circuit is configured to allocate the first task to one or more cores of the plurality of cores designated based on priority set by a user.

8. The processor of claim 1, wherein the plurality of cores are a plurality of different digital signal processors.

9. A task processing method of a processor including a plurality of cores capable of performing operations independently, a memory, and a control circuit electrically connected to the plurality of cores and the memory, the task processing method comprising:
acquiring one or more first instructions, the one or more first instructions being associated with a first task to be processed using at least one of the plurality of cores;
storing data corresponding to the first task in the memory based on the one or more first instructions;
transmitting an event, including at least one of the acquired one or more first instructions, to at least two of the plurality of cores;
checking, in response to receiving a response to the event from one or more cores of the at least two cores, whether the one or more cores that have responded to the event are able to process the transmitted one or more first instructions;
allocating the first task to one core among the one or more cores that have responded and are able to process the transmitted one or more first instructions, if the first task is not allocated to the plurality of cores; and
preventing the first task from being allocated to the plurality of cores except for the one core if the first task is allocated to the one core,
wherein the allocation of the first task includes changing state information associated with the allocation and setting other cores to which the first task is not allocated, from among the plurality of cores, to not access the data corresponding to the first task.

10. The task processing method of claim 9, wherein the one core is first among the at least two of the plurality of cores to respond to the one or more first instructions among the at least two cores.

11. The task processing method of claim 9, wherein the storing of the data corresponding to the first task in the memory comprises storing task instructions in a queue storage device having a FIFO structure.

12. The task processing method of claim 9, further comprising generating, by the control circuit, an interrupt based on an event and transmitting the first task to the one or more cores having responded to the at least one of the one or more first instructions with an interrupt request (IRQ) control circuit included in the control circuit.

13. The task processing method of claim 9, wherein the memory is an SRAM and embedded in the control circuit.

14. The task processing method of claim 13, further comprising allocating, by the control circuit, an address for storing the data corresponding to the first task and storing the data corresponding to the first task in the allocated address of the memory in response to the acquisition of the one or more first instructions associated with the first task to be processed with an SRAM address controller.

15. The task processing method of claim 9, further comprising allocating the first task to one or more cores of the plurality of cores designated based on priority set by a user.

16. The task processing method of claim 9, wherein the plurality of cores are a plurality of different digital signal processors.

17. An architecture comprising:
a plurality of cores including a plurality of different digital signal processors or at least one hardware accelerator; and
a control circuit electrically connected to the plurality of cores,
wherein the control circuit is configured to
receive, from at least one of the plurality of cores, a task processing request corresponding to a first task,
store instructions and information associated with the first task in an internal memory,
transmit at least some of the stored instructions associated with the first task, to the plurality of cores in an event form,
check, in response to receiving a response to the event from one or more cores of the plurality of cores, whether the one or more cores that have responded to the event are able to process the transmitted instructions associated with the first task,
allocate the first task to one core among the plurality of cores that has first responded to the event and that is able to process the transmitted instructions, and
prevent the first task from being allocated to the plurality of cores except for the one core if the first task is allocated to the one core,
wherein the allocation of the first task includes changing state information associated with the allocation and setting other cores to which the first task is not allocated, from among the plurality of cores, not to access the information corresponding to the first task.

18. The architecture of claim 17, wherein if the first task is allocated to the one core, the control circuit is configured not to allocate the first task to others of the plurality of cores.

19. The architecture of claim 18, wherein the allocation of the first task by the control circuit comprises:
changing state information associated with the allocation; and
preventing the others of the plurality of cores from accessing data corresponding to the first task.

20. The architecture of claim 17, wherein the control circuit includes a queue storage device that stores and manages task instructions in a FIFO structure.

* * * * *